S. B. ARNOLD.
VALVE.
APPLICATION FILED AUG. 15, 1918.
1,347,488. Patented July 27, 1920.
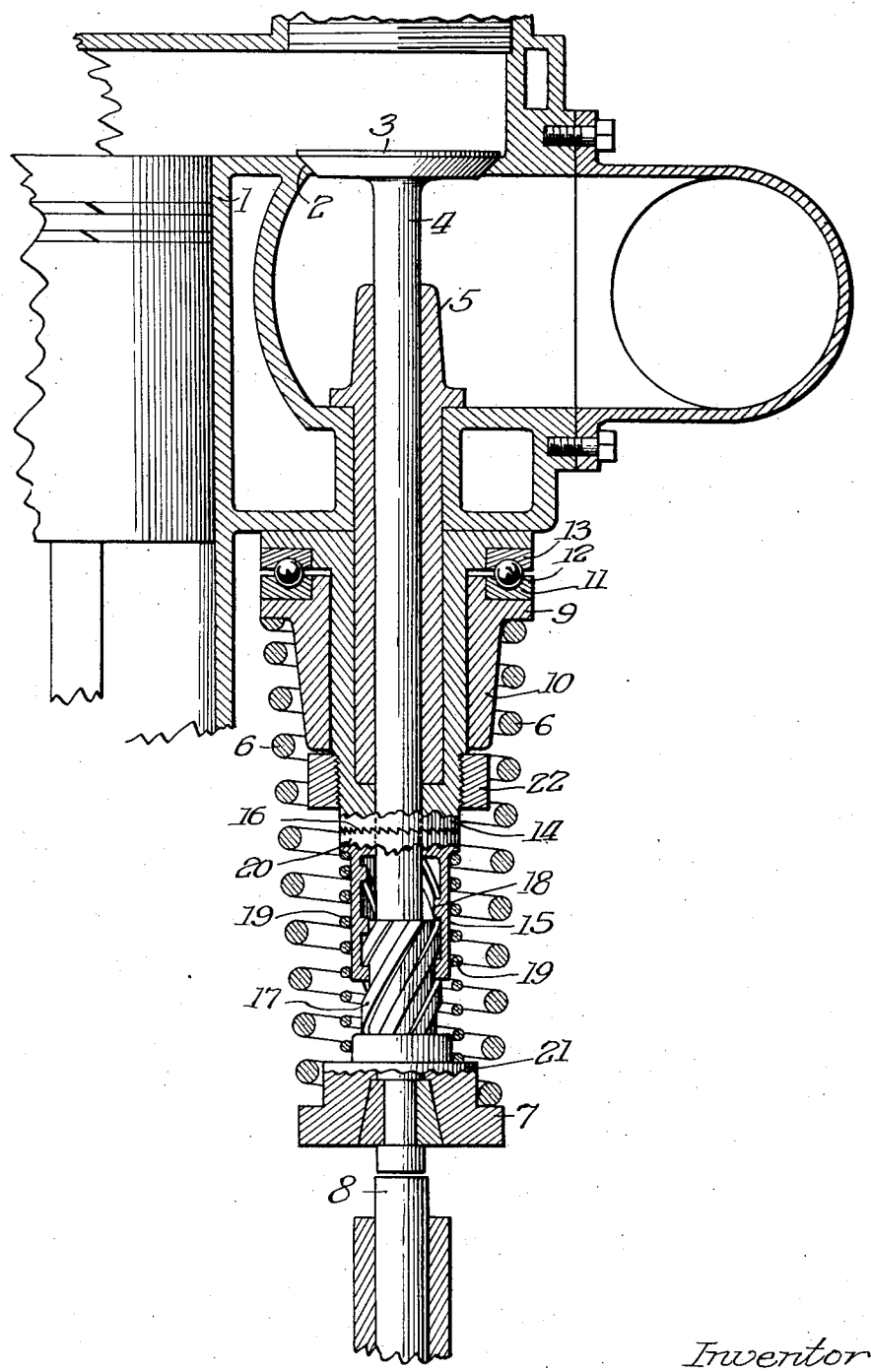
Inventor:
Stanley B. Arnold
By G. L. Gragg
Atty

UNITED STATES PATENT OFFICE.

STANLEY B. ARNOLD, OF CHICAGO, ILLINOIS.

VALVE.

1,347,488.  Specification of Letters Patent.  Patented July 27, 1920.

Application filed August 15, 1918. Serial No. 250,015.

*To all whom it may concern:*

Be it known that I, STANLEY B. ARNOLD, citizen of the United States, residing at Chicago, in the county of Cook and State of Illinois, have invented a certain new and useful Improvement in Valves, of which the following is a full, clear, concise, and exact description.

My invention relates to valve structures and has for its object the provision of automatically operated means for effecting rotative step by step movement of the valve upon its seat to prevent warping and undesirable wearing of the valve and its seat. The invention is of particular service in connection with puppet valves.

In carrying out my invention I provide mechanism whereby the valve will be turned in one of its longitudinal movements and will be prevented from turning on reversal of such movement. A construction made in accordance with the preferred embodiment of my invention includes a valve seat, a valve, a stem for the valve, a guide for the valve stem, a coiled spring for closing the valve and surrounding the valve stem, a seat carried by the valve stem for one end of said coiled spring, an anti-friction bearing engaged by the other end of the coiled spring, a stationary member surrounding said valve stem, a hollow rotatable toothed member in tooth engagement with the aforesaid stationary member, the interengaging portions of these members being formed to permit said rotatable member to turn in one direction and to prevent it from turning in the reverse direction, a worm substantially fixed upon the valve stem and operating within the hollow rotatable toothed member and in tooth engagement therewith, and a second spring for maintaining said rotatable toothed member in tooth engagement with said stationary member, the engagement between the worm and the rotatable toothed member permitting the rotatable toothed member to move away from the stationary member to break the engagement between these members.

I will explain my invention more fully by reference to the accompanying drawing showing the preferred embodiment thereof as applied to an engine puppet valve, parts being shown in section and parts in elevation.

The engine portion 1 illustrated is shown with a valve seat 2 which is adapted to receive a valve 3. This valve has a stem 4 that moves longitudinally of itself in the stem guide 5 which is held in fixed relation to the engine to be stationary. A coiled spring 6 surrounds the valve stem and presses downwardly thereon by reason of the engagement of the lower end of the spring with a spring seat 7 carried upon the stem, the spring thus serving to close the valve upon its seat. An engine operated cam, operating through a plunger 8 intermittently operates upon the stem to elevate it against the force of the spring intermittently to open or unseat the valve. The upper end of the spring engages the flange 9 upon the sleeve 10. This sleeve is co-axial with the valve stem and is rotatable about the same and for the purpose of its rotation the upper end of the sleeve carries a ball or roller raceway 11 which bears upwardly against the balls or rollers 12 of an anti-friction bearing which in turn rotate upon the raceway 13 carried by the engine structure. The spring not only exerts the valve closing function specified but, in each cycle of its operation, permits a partial rotation of the valve by mechanism now to be described.

A stationary toothed member 14 is also in the nature of a sleeve about which the sleeve 10 turns and which is in driving fit with the guide 5 so that this toothed member will not rotate. The teeth of the member are formed upon the lower end thereof, this member being made of machine steel because of these teeth and therefore separately made from the cast iron element 5 that carries it. Another toothed member 15 surrounds the valve stem together with the member 14, these three elements being co-axial. The engaging teeth formed upon these members are indicated at 16, these teeth being desirably radially directed and so formed as to permit the toothed member 15 to rotate in clockwise direction as the structure is viewed in the drawing and to prevent counter-clockwise rotation of this element. A worm 17 is normally in fixed relation with the stem 4 to move up and down and turn therewith. The teeth of this worm mesh with internal teeth 18 provided within the toothed member 15 which is made hollow to surround the worm 17. The teeth upon the elements 15 and 17 are sloped according to the sloping of the teeth 16 so that the toothed member 15 will be held when the valve rises to force a turning of the valve in order that the valve may have new or changed engagement with its seat. The turning movement of the valve during its ascent encounters no material opposition from the spring 6 due to the presence of the roller or ball bearing structure that constitutes an abutment for the upper end of this spring, this roller bearing structure permitting the spring 6 to turn easily with the turning worm 17 and the valve coupled with this worm. To prevent the valve from being turned back to its original position on the descent of the valve, the toothed member 15 is permitted to turn owing to the slippage of the teeth at 16 then occurring. The toothed member 15 will turn, rather than the worm 17, on the descent of the valve since the parts that move with the worm encounter more friction and opposition to rotation than does the toothed element 15. A second spring 19 is provided for maintaining the toothed member 15 in tooth engagement with the toothed member 14, the upper end of this spring bearing against a shoulder 20 formed on the element 15 and the lower end of this spring bearing upon an upward extension 21 of the seat 7. The engagement between the teeth of the elements 15 and 17 is sufficiently loose to permit of the depression of the element 15 when this element is turned upon the downward movement of the valve. The spring 19 is preferably a light spring and, although light, serves to supplement the spring 6 in closing the valve on the descent of the plunger 8. As the spring 19 is compressed on the upward movement of the valve it also twists and when the valve descends this spring will untwist and, in so doing, will take part in effecting the rotation of the toothed element 15 further to avoid fixed connection between this toothed element 15 and the valve stem on the downward movement of the valve further to guard against the reverse rotation of the worm 17.

The toothed member 14 may be provided with a threaded sleeve or nut 22 at its lower end to form a displaceable shoulder upon the member 14 which underlies the rotatable sleeve thereon. Slight clearance normally intervenes between this shoulder and the sleeve 10 so that the bodily rotation of the spring 6 will not be checked as the valve 3 turns. When the valve is removed from the engine, the shoulder 22 will prevent material descent of the rotatable sleeve 10 to prevent the disassembly of said roller bearing whose members are held by said shoulder substantially in normal location when the valve is removed.

I do not limit myself to the turning of the valve on its downward movement nor to the separate formation of the worm 7 upon the stem 4 since this worm merely constitutes an enlargement of such stem and affords tooth engagement between the stem and the turning member 15.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:

1. A valve structure including a valve seat; a valve; a stem for the valve; a stationary toothed member; a rotatable toothed member in separable tooth engagement with the aforesaid stationary toothed member, the interengaging portions of these members being formed to permit said rotatable toothed member to turn in one direction and to prevent it from turning in the reverse direction; and a worm substantially fixed upon the valve stem and operating within the rotatable toothed member.

2. A valve structure including a valve seat; a valve; a stem for the valve; a spring for closing the valve; a stationary toothed member; a rotatable toothed member in separable tooth engagement with the aforesaid stationary toothed member, the interengaging portions of the members being formed to permit said rotatable toothed member to turn in one direction and to prevent it from turning in the reverse direction; and a worm substantially fixed upon the valve stem and operating within the rotatable toothed member.

3. A valve structure including a valve seat; a valve; a stem for the valve; a coiled spring for closing the valve; an anti-friction bearing engaged by one end of said coiled spring; a stationary toothed member; a rotatable toothed member in separable tooth engagement with the aforesaid stationary toothed member, the interengaging portions of these members being formed to permit said rotatable toothed member to turn in one direction and to prevent it from turning in the reverse direction; and a worm substantially fixed upon the valve stem and operating within the rotatable toothed member.

4. A valve structure including a valve seat; a valve; a stem for the valve; a coiled spring for closing the valve and surrounding the valve stem; an anti-friction bearing engaged by one end of said coiled spring; a stationary toothed member surrounding the valve stem; a rotatable toothed member surrounding the valve stem and in separable tooth engagement with the aforesaid stationary toothed member, the interengaging portions of these members being formed to permit said rotatable toothed member to turn in one direction and to prevent it from turning in the reverse direction; a worm substantially fixed upon the valve stem and operating within the rotatable toothed member; and a second spring for maintaining said rotatable toothed member in tooth engagement with said stationary toothed member, the engagement between the worm and the rotatable toothed member permitting the rotatable toothed member to move away from the stationary toothed member to break the engagement between these members.

5. A valve structure including a valve seat; a valve; a stem for the valve; mechanism for lifting the valve from its seat; mechanism for rotating the valve when unseated, the lifting and rotating mechanisms operating upon the valve stem remote from the valve; an anti-friction bearing between the valve and the lifting and rotating mechanisms; a spring exerting pressure upon the valve stem in a valve closing direction at one end of the spring and engaging one member of said bearing at its other end; and means for maintaining assembly of the member of the bearing engaged by the spring with the complemental member of the bearing substantially in normal location when the valve is removed.

6. A valve structure including a valve seat; a valve; a stem for the valve longitudinally of whose axis the valve is movable; a stationary toothed member; a rotatable toothed member in separable tooth engagement with the aforesaid toothed member, the inter-engaging portions of these members being formed to permit said rotatable toothed member to turn in one direction and to prevent it from turning in the reverse direction; and an element substantially fixed with respect to the valve stem and which is connected with the rotatable toothed member to be turned thereby on longitudinal movement of the valve stem.

7. A valve structure including a valve seat; a valve; a stem for the valve longitudinally of whose axis the valve is movable; a stationary member; a rotatable member in creeping engagement with the stationary member, these members being formed to permit the rotatable member to turn in one direction and substantially to prevent it from turning in the reverse direction; and a worm substantially fixed upon the valve stem and operating within the rotatable member.

8. A valve structure including a valve seat; a valve; a stem for the valve longitudinally of whose axis the valve is movable; a stationary member; a rotatable member in creeping engagement with the stationary member, these members being formed to permit the rotatable member to turn in one direction and substantially to prevent it from turning in the reverse direction; and an element substantially fixed with respect to the valve stem and which is connected with the rotatable member to be turned thereby on longitudinal movement of the valve stem.

9. A valve structure including a valve seat; a valve; a stem for the valve longitudinally of whose axis the valve is movable; a stationary toothed member; a rotatable toothed member in separable tooth engagement with the aforesaid stationary toothed member, the interengaging portions of these members being formed to permit said rotatable toothed member to turn in one direction and to prevent it from turning the reverse direction; an element substantially fixed with respect to the valve stem and which is connected with the rotatable toothed member to be turned thereby on longitudinal movement of the valve stem; and a spring for pressing the rotatable toothed member into engagement with the stationary toothed member and permitting the rotatable toothed member to move longitudinally of the valve stem.

10. A valve structure including a valve seat; a valve; a stem for the valve longitudinally of whose axis the valve is movable; a stationary member; a rotatable member in creeping engagement with the stationary member, these members being formed to permit the rotatable member to turn in one direction and substantially to prevent it from turning in the reverse direction; an element substantially fixed with respect to the valve stem and which is connected with the rotatable member to be turned thereby on longitudinal movement of the valve stem; and a spring for pressing the rotatable member into engagement with the stationary member and permitting the rotatable member to move longitudinally of the valve stem.

In witness whereof, I hereunto subscribe my name this 31st day of July, A. D. 1918.

STANLEY B. ARNOLD.